United States Patent Office 3,293,186

Patented Dec. 20, 1966

3,293,186

ADDING AND RESTORING IMAGE AREAS TO PLATES

Simon L. Chu, New York, and Gerald F. O'Connor, Ossining, N.Y., assignors to Polychrome Corporation, Yonkers, N.Y.

No Drawing. Filed Apr. 15, 1963, Ser. No. 272,850
6 Claims. (Cl. 252—79.3)

This invention relates to a method of imparting a strongly oleophilic surface to lithographic plates and to novel compositions useful in the surfacing process. This invention further relates to the restoration of an image area to a lithographic plate.

The art of planographic printing depends upon the immiscibility of grease and water and upon the preferential retention of a greasy image-forming substance by the image areas, and a similar retention of an aqueous dampening fluid by the non-image areas. When a greasy image is imprinted upon a suitable surface, and the entire surface is then moistened with an aqueous solution, the image areas will repel the water, and the non-image areas will retain the water. Upon subsequent application of greasy ink, the image portions retain the ink, whereas the moist, non-image areas will repel it. The image is then transferred to paper, cloth, and so on, via an intermediary, so called off-set or blanket cylinder, which is necessary to prevent mirror-image printing.

Lithograph plates typically are sheet structures on which a photo-sensitive coating, usually diazo compound, is exposed to light through a negative transparency causing the light-sensitized material to harden, thereby becoming insoluble in a de-sensitizing solution which is applied to the plate after the light exposure for the purpose of removing that part of the light-sensitive coating which, because it was protected from the light by the negative, was not light-hardened. The light-hardened surface of, for example, a negative plate will be the oleophilic surface which is compatible with the greasy ink and is called the "image area"; the surface from which the non-hardened light sensitive material has been removed with desensitizer will be the hydrophilic surface.

Of course, it will be understood by those skilled in the art that the compositions and procedures herein disclosed are equally applicable to the addition or restoration of oleophilic image areas to positive plates, i.e. those whereon the original image areas have been chemically hardened. Furthermore, it is immaterial in the practice of the present invention whether the lithographic plate to be treated is a presensitized plate or one on which the light sensitive coating, e.g. diazo, is coated at the time of use or shortly before use.

There are certain problems which arise in using lithographic plates. It has always been economically desirable to obtain a plate which would have the longest possible press life. However, often in the course of an extended press run, the image area loses its oleophilic nature, ceases to attract the greasy ink, and therefore ceases to print. The causes of this loss of image are varied and include the embedment of paper lint on the lithographic plate, the disruption of the image area by a piece of tramp metal, and excessive wear in one part of the image caused by defects in the press rolls, etc. In any case, the loss of image area is a serious problem to users of lithographic plates because the press must be shut down while the image area is restored or while a new plate is prepared. Similarly, it is often desired to add an image to an area that has not been previously made ink-receptive. For example, the addition of a date line or some other matter erroneously omitted from the original plate may be desired. In such circumstances, it is desirable to transform the non-light-hardened surface into an oleophilic area.

The prior art methods of restoring and adding image areas have been deficient in that the restored or added areas do not remain sufficiently oleophilic for long runs; thus the press must be shut down time and again until the run is finished.

In order to restore an ink-receptive surface, it has heretofore been necessary to "tusche" the indicated image area by mechanical means. Thus the interfering material, for example the paper lint, was removed from the plate with sandpaper or gently scraped from the plate with a knife, etc. The area was then re-lacquered and the press run continued. The short press-life of the restored images was, in large part, the result of the relatively poor bond between the renewed image area and the protective lacquer. Furthermore, the risk of permanently damaging the plates was rather high when using the prior art method of image restoring.

A process has now been discovered by which the image area may be restored to lithographic plates in a more easily controlled manner with relatively little risk of plate damage and by which a restored image area may have a considerably increased press life. This latter improvement is due primarily to the increased strength of the bond between the restored image and the lacquer.

The process may be further used in the establishment of entirely new oleophilic image areas on non light-hardened portions of the lithographic plate which, prior to treatment are oleophobic.

This process utilizes a novel tusche composition which comprises a strongly oleophilic material compounded with an abrasive, etching acid, surfactant, and a suspending agent. This composition is applied to the area on which an oleophilic image surface is sought to be restored, rubbed over the surface and kept in contact therewith for a short time, and the excess of the composition is removed. This procedure leaves an oleophilic image area upon the plate which area is strongly bonded to the residual tusche composition which acts in the nature of a lacquer, protecting the newly restored image area, and greatly extending the press-life of said image area over the press-life of image areas restored by methods known in prior art.

Oleophilic compounds incorporated into the composition of the instant invention may be chosen from among such compounds as aliphatic acids and aliphatic alcohols. The fatty portion of the molecule being the dominant portion provides the necessary oleophilic component. The smaller and more reactive component of the molecule provides a hydrophilic group which aids the incorporation of the compound into the composition. Preferably, the aliphatic chain will contain 12 or more carbon atoms.

The abrasive material is incorporated into the composition to aid in removal of undesirable materials on the surface of the plate and also to aid in roughening the surface to which the tusche is applied. Such roughening increases the effective bonding area between the tusche and the substratum. Selection of the abrasive material may be made by anyone skilled in the art of preparing chemical compositions. Pumice is typical of abrasive materials useful in the present invention and is entirely adequate for use therein.

The acid may be chosen from etching acids such as hydrofluoric acid and hexafluozirconic acid. However, the latter acid is preferred in that it causes no handling or packaging problem and may readily be compounded with the other ingredients long before actual use of the composition whereas acids such as hydrofluoric acid must not be packaged in glass containers for extended periods and tend to decrease the shelf-life of the composition under some storage conditions. Although the acid may be synthesized directly by the manufacturer of the tusche compositions, it is usually more convenient to add it to the composition in a commercially-available aqueous solution.

An acidic gum material is suitably used as a suspending agent. When incorporated with the other ingredients, this material provides a lacquer-like consistency for the tusche composition. Furthermore, it is the residual gum that provides a suitable coating for the renewed image area and provides, because of the excellent bond between gum and image area, an excellent press-life for the new or restored ink-receptive surface. An example of a suitable gum material is gum arabic.

Surfactants, such as aliphatic alcohol sulfates commercially available under the trade name Duponol, may also be incorporated into the composition to aid in the compounding and also provide an additional oleophilic component having a hydrophilic group. The lauryl alcohol sulfate is particularly suitable.

In order to point out more fully the nature of the present invention, the following specific examples are given as illustrative embodiments of the present invention and products with which it is accomplished.

*Example I*

The following composition was prepared by ordinary mixing techniques known to the art, the ingredients having been added in the order listed:

| | Pounds |
|---|---|
| Oleic acid | 18.5 |
| Pumice | 5.0 |
| Technical lauryl sodium sulfate (Duponol WAQ) | 1.0 |
| Gum arabic | 23.0 |
| Hexafluozirconic acid solution (11% by weight of acid in water) | 0.5 |

The composition was packaged in plastic containers.

An aluminum offset plate 10 inches by 15 inches and .005 inch thick was coated, consecutively and in the ordinary manner known to the art, with an alkali silicate coating and a light sensitive diazo compound. This plate was exposed to light through a negative transparency and given a protective coating of lacquer. A short press run was made with the plate. The run was then interrupted to add a date line to the image. This was accomplished as follows:

A portion of the above-described composition was wiped over the plate with a cotton swab and rubbed onto that oleophobic area to which an image was to be added. After 10 seconds of rubbing the tusche composition on the area, the area was washed with water and rubbed with ink. The ink stayed on the area which had been treated with the tusche composition, indicating the transformation of the area which had been oleophobic into the desired oleophilic area. The press run was continued, the treated area, i.e. the date line, appeared clearly upon the prints.

*Example II*

Dodecyl alcohol was substituted for oleic acid in the formula of Example I. In other respects the procedure and results were the same.

*Example III*

The following composition was prepared by ordinary mixing techniques known to the art, the ingredients having been added in the order listed.

| | Pounds |
|---|---|
| Dodecyl alcohol | 12.0 |
| Technical lauryl sodium sulfate (Duponol WAQ) | 2.0 |
| Pumice | 2.5 |
| Gum arabic | 30.0 |
| Hydrofluoric acid solution (35% HF in water) | 1.0 |

The composition was packaged in plastic containers.

An aluminum offset plate 10 inches by 15 inches and .005 inch thick was coated, consecutively and in the ordinary manner known to the art, with an alkali silicate coating and a light sensitive diazo compound. This plate was exposed to light through a negative transparency and given a protective coating of lacquer. A short press run was made with the plate. The run was then interrupted to add a date line to the image. This was accomplished as follows:

A portion of the above-described composition was wiped over the plate with a cotton swab and rubbed onto that oleophobic area to which an image was to be added. After 10 seconds of rubbing the tusche composition on the area, the area was washed with water and rubbed with ink. The ink stayed on the area which had been treated with the tusche composition, indicating the transformation of the area which had been oleophobic into the desired oleophilic area. The press run was continued, the treated area, i.e. the date line, appeared clearly upon the prints.

*Example IV*

The following composition was prepared by ordinary mixing techniques known to the art, the ingredients having been added in the order listed:

| | Pounds |
|---|---|
| Oleic acid | 8.0 |
| Technical lauryl sodium sulfate (i.e. Duponol WAQ) | 1.0 |
| Pumice | 5.0 |
| Gum arabic | 19.0 |
| Hexafluozirconic acid solution (11% by weight in water) | 0.2 |

The composition was packaged in plastic containers.

An aluminum offset plate 10 inches by 15 inches and .005 inch thick was coated, consecutively and in the ordinary manner known to the art, with an alkali silicate coating and a light sensitive diazo compound. This plate was exposed to light through a negative transparency and given a protective coating of lacquer. A short press run was made with the plate. The run was then interrupted to add a date line to the image. This was accomplished as follows:

A portion of the above described composition was wiped over the plate with a cotton swab and rubbed on to that oleophobic area to which an image was to be added. After 10 seconds of rubbing the tusche composition on the area, the area was washed with water and rubbed with ink. The ink stayed on the area which had been treated with the tusche composition indicating the transformation of the area which had been oleophobic into an oleophilic area. The press run was continued, the treated area, i.e. the date line, appeared clearly upon the prints.

*Example V*

Dodecyl alcohol was substituted for oleic acid in the formula of Example IV. In other respects the procedure and results were the same.

It is of course to be understood that the foregoing examples are intended to be illustrative and that various changes can be made in the ingredients, proportions, and conditions set forth therein without departing from the spirit of the invention as defined in the appended claims.

What is claimed is:

1. A composition for transforming an oleophobic non-image area of a lithographic plate into an oleophilic image area consisting essentially of an aliphatic compound selected from the group consisting of oleic acid and dodecyl alcohol, about 0.275% to 2.92% of hydrogen zirconium fluoride, about 20.8% to 62.5% of an abrasive, about 124% to 250% of an acidic gum, and as a surfactant about 5.4% to 16.7% of a fatty alcohol sulfate, said percentages being calculated on the weight of said aliphatic compound.

2. A composition according to claim 1 wherein said abrasive is pumice, said acidic gum is gum arabic, and said surfactant is lauryl sodium sulfate.

3. A composition according to claim 1 wherein said aliphatic compound is oleic acid.

4. A method for transforming an oleophobic non-image area of a lithographic plate into an oleophilic image area which comprises treating said non-image area with a composition consisting essentially of an aliphatic compound selected from the group consisting of oleic acid and dodecyl alcohol, about 0.275% to 2.92% of hydrogen zirconium fluoride, about 20.8% to 62.5% of an abrasive, about 124% to 250% of an acidic gum, and as a surfactant about 5.4% to 16.7% of a fatty alcohol sulfate, said percentages being calculated on the weight of said aliphatic compound.

5. A method according to claim 4 wherein said abrasive is pumice, said acidic gum is gum arabic, and said surfactant is lauryl sodium sulfate.

6. A method according to claim 4 wherein said aliphatic compound is oleic acid.

References Cited by the Examiner

UNITED STATES PATENTS

| | | | |
|---|---|---|---|
| 2,037,716 | 4/1936 | Goedike | 156—14 XR |
| 2,152,406 | 3/1939 | Ducamp | 252—143 |
| 2,311,047 | 2/1943 | Hagelin | 252—79.4 XR |
| 2,525,078 | 10/1950 | Pabst et al. | 252—143 |
| 2,756,131 | 7/1956 | Neunzig | 252—79.3 XR |
| 2,780,168 | 2/1957 | Nichols | 252—143 XR |
| 2,942,956 | 6/1960 | Kelly | 252—79.3 XR |
| 2,946,683 | 7/1960 | Mellan et al. | |
| 3,008,409 | 11/1961 | Wentworth et al. | 156—14 XR |
| 3,018,211 | 1/1962 | Duke | 252—79.3 XR |
| 3,060,848 | 10/1962 | Beutner | 101—149.2 |

OTHER REFERENCES

The Condensed Chem. Dict., 6th ed. (1961) Reinhold Publ. Co. page 654.

Prideaux Journal of Chemical Society, page 903 relied on.

LEON D. ROSDOL, *Primary Examiner.*

JULIUS GREENWALD, *Examiner.*

W. E. SCHULZ, *Assistant Examiner.*